US006814822B2

(12) United States Patent
Holmes et al.

(10) Patent No.: US 6,814,822 B2
(45) Date of Patent: Nov. 9, 2004

(54) COMPOSITE MATERIAL COLLATION MACHINE AND ASSOCIATED METHOD FOR HIGH RATE COLLATION OF COMPOSITE MATERIALS

(75) Inventors: Scott T. Holmes, Oxford, PA (US); Bruce E. McIlroy, St. Charles, MO (US); Roger W. Engelbart, Shrewsbury, MO (US); Stanley A. Lawton, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/664,148

(22) Filed: Sep. 17, 2003

(65) Prior Publication Data

US 2004/0060650 A1 Apr. 1, 2004

Related U.S. Application Data

(62) Division of application No. 10/068,735, filed on Feb. 6, 2002.

(51) Int. Cl.[7] .............................................. B32B 31/20
(52) U.S. Cl. ........................ 156/64; 156/184; 156/191
(58) Field of Search .............................. 156/351, 358, 156/359, 166–181, 184–195, 64

(56) References Cited

U.S. PATENT DOCUMENTS

| 5,066,352 | A | * | 11/1991 | Albers et al. ................ 156/265 |
| 5,177,340 | A | | 1/1993 | Zaffiro |
| 5,562,788 | A | | 10/1996 | Kitson et al. |
| 5,626,471 | A | | 5/1997 | Howie et al. |
| 5,886,313 | A | | 3/1999 | Krause et al. |
| 6,451,152 | B1 | | 9/2002 | Holmes et al. |

FOREIGN PATENT DOCUMENTS

DE 42 34 342 A1 4/1994

OTHER PUBLICATIONS

Engelbart, Roger W., et al., In–Process Monitoring of Pre–Staged Fiber Placement Tows Using Nuclear Magnetic Resonance (NMR), Proceedings of the 43$^{rd}$ International SAMPE Symposium, Anaheim, California, May 31–Jun. 4, 1998.

Lichtenwalner, P.F., Neural Network–Based Control for the Fiber Placement Composite Manufacturing Process, Journal of Materials Engineering and Performance, vol. 2(5), Oct. 1993, p. 687.

Wang, Eric L., Effects of Laps and Gaps on the Processing of Advanced Thermoplastic Composites, Thesis, Massachusetts Institute of Technology, Jan. 1991.

* cited by examiner

*Primary Examiner*—Melvin C. Mayes
*Assistant Examiner*—George R. Koch, III
(74) *Attorney, Agent, or Firm*—Alston & Bird LLP

(57) ABSTRACT

A composite material collation machine and associated method for fiber tape placement and consolidation at a relatively high rate are provided. The composite material collation machine includes a laser diode array for heating at least one fiber tape, a compaction device for pressing the fiber tape against a workpiece, an inspection system for monitoring the fiber tape, and a controller. The inspection system produces an output representative of at least one characteristic of the fiber tape, and the controller is capable of receiving the output and, based on the output, automatically altering at least one system parameter defining an operational characteristic of the composite material collation machine.

20 Claims, 4 Drawing Sheets

COMPOSITE MATERIAL COLLATION MACHINE AND ASSOCIATED METHOD FOR HIGH RATE COLLATION OF COMPOSITE MATERIALS

CROSS-REFERENCE TO RELATED APPLICATIONS

This application is a divisional of U.S. application Ser. No. 10/068,735, filed Feb. 6, 2002, which is hereby incorporated herein in its entirety by reference.

FIELD OF THE INVENTION

The invention relates to the manufacture of composite articles in an expedited manner and, more specifically, to an apparatus and method for inspecting composite articles during manufacture and automatically altering system parameters based thereon.

BACKGROUND OF THE INVENTION

Composite structures made from fiber-reinforced polymer matrix (resin) materials are commonly manufactured by progressively building up the structure with a plurality of layers of thin composite tape or tow, hereafter collectively referred to as tape, laid one layer upon another. Typically, the operation begins by laying one or more tapes onto a starting template or tool that has a configuration generally corresponding to the desired shape of the article to be produced. A tape placement head guides the one or more continuous tapes onto the template by providing relative movement between the template and the head, such that the head moves over the surface of the template. The head usually makes repeated passes over the template in a defined pattern until the composite material is entirely collated. Multiple plies or layers of tape are built up by continued passes of the head over the surface. A compaction roller is usually used for pressing the tape against the template or prior-laid layers of tape, hereafter collectively referred to as a workpiece. Compaction facilitates adhesion of the tape to the workpiece. The tape, the workpiece, or both are heated just prior to the tape being compacted to soften the resin and promote adhesion of the tape to the workpiece.

Composite structures having a contoured shape can be formed by collating multiple layers on a contoured template. Alternatively, composite structures of varying geometry can be produced by first laying multiple layers of tape on a flat template in the manner described above. After a sufficient thickness is achieved, the composite material is heated and subsequently cured in the shape of a contoured template. Excess material is then removed.

A number of defects can occur during manufacture of composite structures by an automated collation process. For example, gaps between tapes, overlap of tapes, or twists in the tapes can result from unexpected variation in tape width or from improper or imprecise coordination of the placement of the fiber tapes. Such gaps, overlaps, and twists can have significant adverse effects on the strength and durability of the resulting composite material. In addition, adhesion problems can result from insufficient or excessive heating or compacting. Insufficient adhesion increases the likelihood of separation of the successive layers of tape, thereby decreasing the strength of the finished article. Concerns over maintaining adequate adhesion at higher rates are typically addressed by adding excess heat to the material. Unfortunately, it is oftentimes difficult to remedy adhesion problems since the ideal degrees of heating and compacting are mutually dependent and also dependent on such factors as the type of fiber tape employed, the degree of impregnation of the fiber tape, the rate at which the fiber tapes are placed, and ambient conditions, to name a few.

Some defects cannot be repaired, thus increasing the average effective cost per usable part produced. Other defects can be repaired but require costly and time-consuming human intervention. In traditional manufacturing methods, the composite structure is inspected after each layer of tape is placed. Since defects are generally detected manually, an element of subjectivity is disadvantageously introduced into the inspection process. Once defects are detected, a worker repairs the defects if possible. As described, this process requires human intervention during inspection and repair. The fiber placement machine may therefore be completely inoperable or at least slowed during the time required for inspection and repair, thereby reducing the output of the machine. As a result, a conventional fiber placement machine disadvantageously operates at a rate well below its maximum capabilities in most situations, limiting potential throughput.

SUMMARY OF THE INVENTION

The present invention seeks to improve the quality of composite materials and the efficiency of their production by providing an inspection system that provides feedback that is used by a controller to control various system parameters, including an advanced heat source. Integration of the inspection system enables a closed-loop control system that can quickly adjust system parameters to correct or avoid defects in the product, thereby enabling the composite material collation machine to operate much closer to its maximum capabilities than provided by conventional material collation machines. The system therefore offers significant reductions in manufacturing time and cost while also providing an anticipated improvement in quality.

Composite material collation machines include fiber tape placement machines that typically lay several tapes simultaneously as well as machines for placing other types of materials, such as individual tapes several inches wide. While embodiments of the present invention are described in the context of fiber placement, it is understood that each of the embodiments is applicable to all of the other machines and methods for composite material collation.

In one embodiment, the composite material collation machine comprises a fiber placement machine that includes a laser diode array that heats at least one fiber tape, and a compaction roller then compacts the fiber tapes onto a workpiece in a compaction region. The fiber tape therefore conforms to the contour of the workpiece and is adhered thereto. The fiber placement machine also includes an inspection system, typically comprising a camera and/or other sensors, that monitors the process and material and generates an output that is representative of at least one characteristic of the process, such as of the fiber tape or workpiece. By way of example, the inspection system may generate an output that is representative of the temperature of the fiber tape, the temperature of the workpiece, the rate of placement of the fiber tape, the compaction pressure, the tack of the fiber tape, and/or the placement of the fiber tape relative to another fiber tape. The fiber placement machine also includes a controller for processing the output of the inspection system. Based on the output from the inspection system, the controller may adjust at least one system parameter defining an operational characteristic of the fiber placement machine.

For example, the controller may adjust the power of the laser diode array, the temperature of the fiber tape, the temperature of the workpiece, the rate of placement of the fiber tape, the compaction pressure, the tack of the fiber tape, and/or the placement of the fiber tape relative to another tape. In this regard, if the controller detects a gap between two adjacent fiber tapes, the placement of those tapes could be adjusted so that they are placed closer together and/or the temperature and compaction pressure may be increased. If the controller detected lower than optimal adhesion of the tapes, the temperature could be increased by increasing the power of the laser diode array, increasing the compaction pressure, reducing the rate of lay of the tapes, or some combination thereof. Alternatively, the fiber tapes can be monitored before the fiber tapes are compacted with the controller similarly taking appropriate corrective action, albeit generally prior to the production of an unacceptable layer in this instance. For example, a temperature sensor can detect the temperature of the fiber tapes before the compaction device presses the tapes on the workpiece. This may occur either before, during, or after the fiber tape is heated by the laser diode array. The temperature sensor of this embodiment sends an output to the controller that is representative of the temperature at one or more points on the fiber tapes. The controller processes the output of the temperature sensor and adjusts the power of the laser diode array to maintain an appropriate temperature. Similarly, the temperature of the workpiece can be monitored and adjusted accordingly.

The fiber placement machine may also include a marking device capable of indicating defects on the fiber tape. For example, the marking device may spray or otherwise deposit an amount of ink, paint or the like onto the fiber tapes in those areas where defects have been detected. The marking on the fiber tapes enables the location of the defects to be subsequently readily identified either automatically or manually.

The inspection system may include a device for measuring the molecular mobility of the resin of the fiber tape. One way of determining the molecular mobility of the resin is to measure the nuclear magnetic resonance (NMR) T2 relaxation time. Since the molecular mobility, cure, and tack of the resin are related in a predefined manner, the tack of the tape can be monitored accurately and without intrusion based upon the molecular mobility of the resin. The inspection system may therefore include a tack-measuring device which can measure the tack before or after the tape is compacted. The tack-measuring device generates an output that is sent to the controller and the controller adjusts system parameters based on the output. For example, if the resin is detected to be above the preferred tack point or range of tack points, the controller can reduce the power to the laser diode array, decrease the compaction pressure, increase the rate of placement of the fiber tape, or perform some combination of these steps.

The automatic, closed-loop controlled system and method of the present invention can therefore operate faster and with fewer interruptions than conventional fiber placement systems because human intervention is not required for inspection and repair. Thus, the fiber placement machine of the present invention can operate closer to its maximum capacity than a traditional fiber placement machine. Also, by detecting defects quickly, the fiber placement machine and method of the present invention enables defects to be rapidly corrected by automatically adjusting one or more system parameters that define an operational characteristic of the fiber placement machine. In addition, some potential defects may be detected prior to their occurrence, thereby permitting the operational characteristics of the fiber placement machine to be adjusted to avoid the manufacture of a defective article. The result is a part built at a much higher rate with reduction in repair time of defective materials and an avoidance of defective materials that must be scrapped. Thus, the average cost per part is reduced due to the increase in operational efficiency of the machine and the reduction in repair time. Additionally, because defects can be detected more uniformly with the automated system and method than a traditional human inspection, the present invention enables an improvement in the overall quality of the parts produced.

BRIEF DESCRIPTION OF THE DRAWINGS

Figure 1:
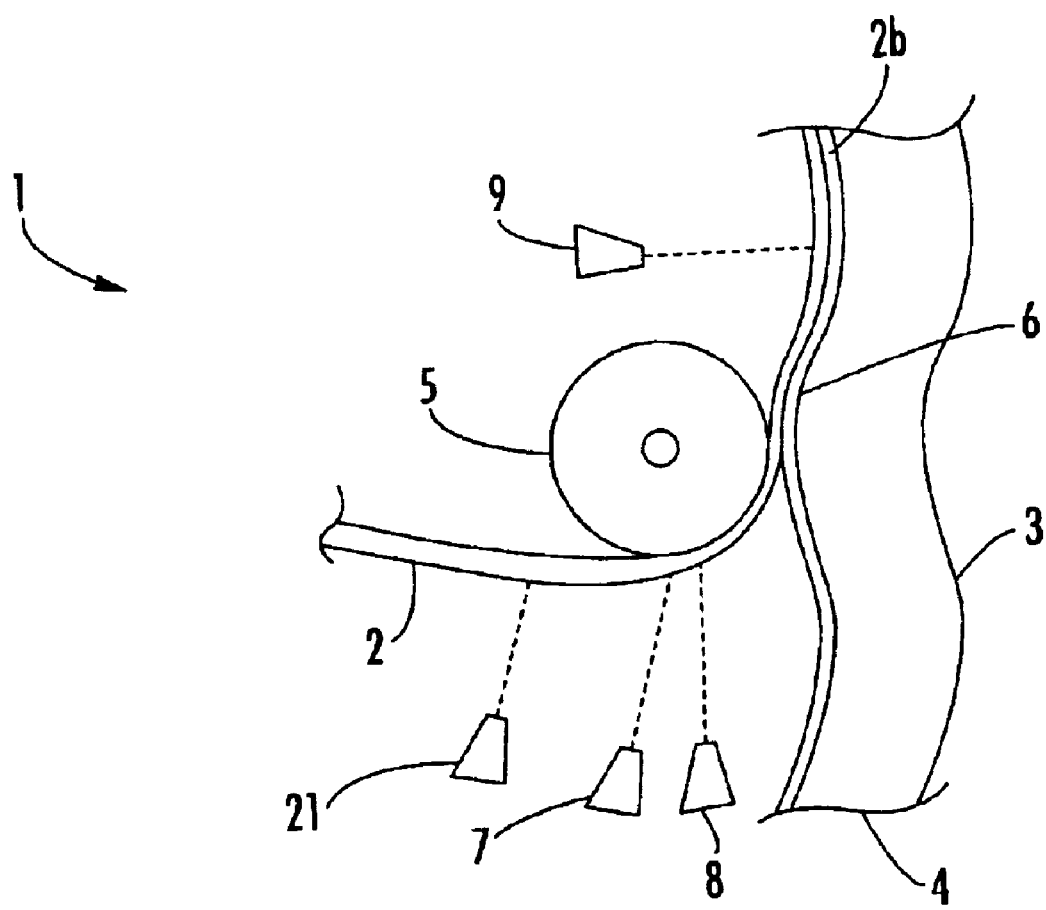
Figure 2:
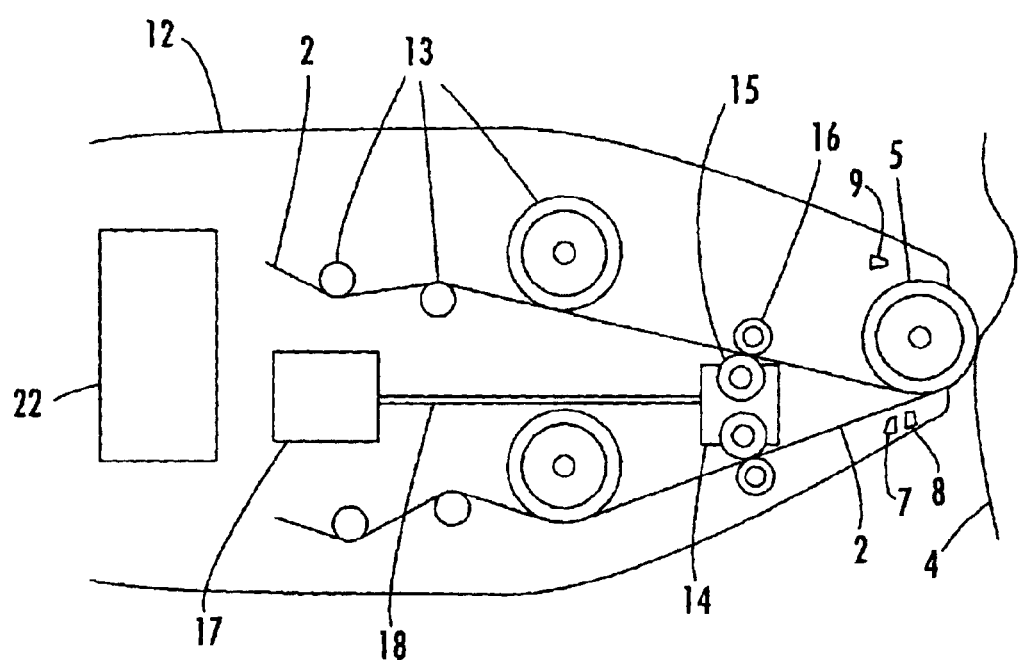
Figure 3:
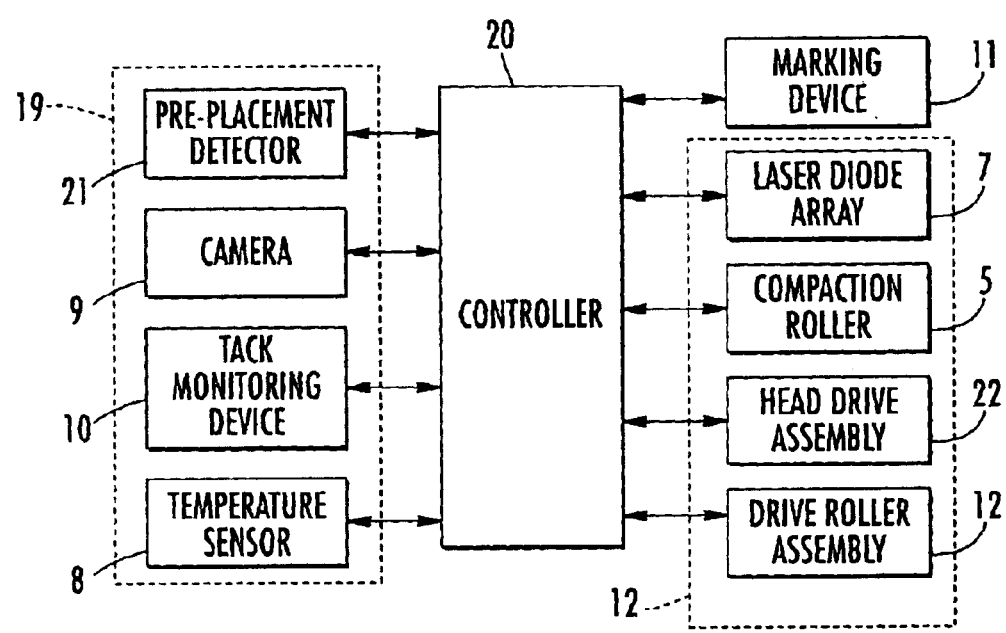
Figure 4:
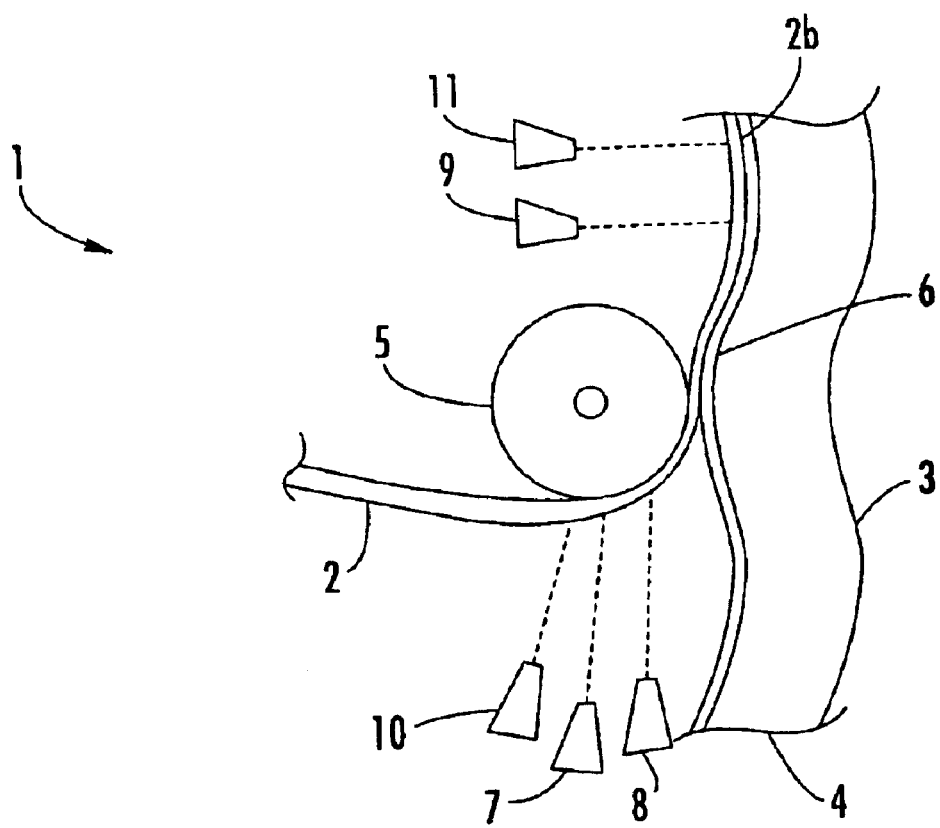

Having thus described the invention in general terms, reference will now be made to the accompanying drawings, which are not necessarily drawn to scale, and wherein:

FIG. 1 illustrates a fiber placement machine according to one embodiment of the present invention;

FIG. 2 illustrates a fiber placement head that may be utilized by the fiber placement machine of one embodiment of the present invention;

FIG. 3 is a block diagram showing the internal communication between the various components of the fiber placement machine of one embodiment of the present invention; and FIG. 4 illustrates a fiber placement machine according to another embodiment of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 shows one embodiment of a composite material collation machine according to the present invention. For descriptive purposes, the composite material collation machine of this embodiment is shown to be a fiber placement machine, broadly denoted by reference numeral 1, but it could similarly be another type of composite material collation machine. It is understood that the fiber placement machine 1 comprises a number of structural elements that are not shown in the figure. A fiber tape 2 is guided in place by a fiber placement head, described more fully in FIG. 2, and placed on a contoured workpiece 4. In this example, the workpiece 4 is composed of a template 3 and one layer of fiber tape 2b that has already been placed and compacted. However, the workpiece 4 may alternatively include only the template 3 or multiple layers of fiber tape 2. A force is applied by a compaction device, here a compaction roller 5, in a direction generally towards the workpiece 4 so that the compaction roller 5 exerts pressure on the fiber tape 2 to press it against the workpiece 4 in a compaction region 6.

FIG. 2 is a diagram of a fiber placement head, which is broadly denoted by reference numeral 12. Although one embodiment of a fiber placement head 12 is illustrated and described, the fiber placement head 12 may be configured in other manners if so described. The fiber placement head 12 of this embodiment comprises a number of cold rollers, collectively referred to as a cold roller assembly 13. The cold roller assembly 13 guides the fiber tapes 2 to a drive roller assembly 14. The drive roller assembly 14 comprises drive rollers 15 and slave rollers 16. The drive rollers 15 are driven by a drive roller motor 17 which is linked to the drive rollers 15 by a drive transfer 18. In this example, the drive transfer 18 is a drive shaft, though it may also be a chain, belt, or gear assembly. The drive rollers 15 rotate and impart motion to the fiber tapes 2, transporting the fiber tapes 2 toward the compaction roller 5.

The fiber placement head 12 is moved relative to the workpiece 4 by a head drive assembly 22 which is generally shown in FIG. 2. The head drive assembly 22 may comprise any of a number of drive devices including, but not limited to, pneumatic or hydraulic actuators, electrical motors or servos, or chain, gear or shaft drive mechanisms. In FIGS. 1 and 2, the fiber placement head 12 moves in a downwardly direction as it places the fiber tape 2, although the workpiece 4 may move instead of or in addition to the movement of the fiber placement head 12. As the fiber tape 2 is placed, the compaction roller 5 rotates, in this example counter-clockwise, to stay in rolling contact with the fiber tape 2. While a compaction roller 5 is depicted, other types of compaction devices may be utilized, such as a compaction shoe or a press.

The fiber placement machine 1 also includes a heat source, such as a laser diode array 7 that is used to heat the fiber tape 2 and/or the workpiece 4. Other possible heat sources include a hot gas torch and an electrical resistance heater. In FIG. 1, the dashed line indicates that the laser diode array 7 directs light energy toward the fiber tape 2 to thereby heat the fiber tape 2. In addition to or as an alternative to the heating of the fiber tapes 2, the laser diode array 7 may heat the workpiece 4. Regardless of whether the fiber tapes 2 and/or the workpiece 4 are heated, the laser diode array 7 preferably delivers sufficient energy to permit the fiber tapes 2, once subjected to the compaction forces, to adhere to the underlying workpiece 4. The laser diode array 7 comprises a number of laser diodes. In one embodiment, each laser diode is electrically coupled to a power source in a manner independent of the other laser diodes so that the operating power of each laser diode can be controlled independently of the other laser diodes. The laser diode array 7 is described in further detail in U.S. patent application Ser. No. 09/578,069, entitled "Method for Heating and Controlling Temperature of Composite Material During Automated Placement," and U.S. patent application Ser. No. 09/998,478, entitled "System, Method, and Computer Program Product for Providing Control for High Speed Fiber Placement," which are herein incorporated by reference.

The individual diodes of the laser diode array 7 may be arranged so that the light from each laser diode is focused on a different area or irradiation zone, though some of the irradiation zones may overlap. Different irradiation zones cover the different fiber tapes 2 and/or areas of the workpiece 4. Thus, by altering the operating power of one or more diodes, the heating of a particular fiber tape 2 and/or a particular area of the workpiece 4 can be controlled independently of the heating of other fiber tapes 2 and other areas of the workpiece 4. Non-uniform heating of the irradiation zones may be desirable, for example, if the fiber tapes 2 are not the same size or are not made of the same materials and thus require different amounts of energy to attain their optimum temperature for placement. Also, different amounts of heating may be desirable due to the geometry of the workpiece 4. For example, if the fiber placement machine 1 is placing fiber tape 2 along a curved path, the fiber tapes 2 being placed on the outside of the curve will follow a curve of greater radius and will be placed at a faster rate than the fiber tapes 2 on the inside of the curve. Thus, those fiber tapes 2 on the outside of the curve may require more heating than the fiber tapes 2 on the inside of the curve. Additionally, the workpiece 4 may require varying amounts of heat depending, for example, on its current temperature and chemical and structural makeup.

FIG. 3 is a block diagram that shows various components of the fiber placement machine 1. The fiber placement machine 1 includes a controller 20, such as a computer processor, a computer workstation, or the like. The arrows that connect the controller 20 to each of the other components of the fiber placement machine 1 indicate that the controller 20 may receive outputs that are generated by each of the components and the controller 20 may also transmit control signals to those components. For example, the controller 20 may transmit a control signal to the laser diode array 7 which causes the laser diode array 7 to increase power, decrease power, maintain a certain power, or activate or deactive certain individual diodes. The laser diode array 7 may also generate an output which is sent to the controller 7. The output from the laser diode array 7 may indicate a status of the laser diode array 7, such as its current operating power or whether any of the individual diodes are dysfunctional. Some of the other communications to and from the controller 20 will be described hereinafter.

According to the present invention, the fiber placement machine 1 and the associated method includes an inspection system 19 for monitoring the fiber tape 2 and/or the workpiece 4 and for providing an output representative of at least one characteristic of the fiber tape 2 and/or the workpiece 4. In one embodiment, the inspection system 19 includes a temperature sensor 8 that measures the temperature of the fiber tape 2 and/or the workpiece 4. In FIG. 1, it can be seen that the temperature sensor 8 is configured to measure the temperature of the fiber tape 2 before the tape 2 enters the compaction region 6. Alternatively, the temperature sensor 8 can measure the temperature of the fiber tape 2 and/or the workpiece 4 within the compaction region 6 or downstream of the compaction region 6. As shown in FIG. 3, the temperature sensor 8 generates an output that is sent to the controller 20. In some embodiments the temperature sensor 8 is configured to measure the temperature of a plurality of areas, or sensing zones, on the fiber tapes 2 and/or the workpiece 4. These sensing zones may occur before or after the fiber tapes 2 are heated by the laser diode array 7 and before or after the fiber tapes 2 are compacted by the compaction roller 5. Because the controller 20 can alter the power of individual laser diodes of the laser diode array 7 in response to the output from the temperature sensor 8, the controller 20 can alter the rate of heating only for those irradiation zones that require an adjustment.

The inspection system 19 can also monitor the fiber tapes 2 and/or the workpiece 4 within and/or downstream of the compaction region 6. For example, the inspection system 19 may include a camera 9 for obtaining an image of fiber tape 2 after the fiber tape 2 passes through the compaction region 6 as shown in FIG. 1. The camera 9 also generates an output that is sent to the controller 20 as shown in FIG. 3. The output generated by the camera 9 may be representative of a number of characteristics of the fiber tape 2. For example, the camera 9 in this embodiment monitors the placement of the fiber tapes 2 after they have been compacted by the compaction roller 5. The camera 9 preferably obtains a digital image that can be analyzed by the controller 20 to identify flaws such as gaps between the fiber tapes 2, overlaps of the fiber tapes 2, or twists in the fiber tapes 2. In order to assist in the identification of these flaws, the inspection system 19 may also include a temperature sensor 8 for sensing the temperature at various points on the fiber tapes 2 and/or the workpiece 4 since these flaws oftentimes create temperature variations in the fiber tape(s) 2.

The controller 20 receives the output from the inspection system 19 and adjusts at least one system parameter defining an operational characteristic of the fiber placement machine 1. In this embodiment, the controller 20 receives the output from the camera 9 and from the temperature sensor 8 in those embodiments that also include a temperature sensor 8 downstream of the compaction region 6. Based on its analysis of the output provided by the inspection system 19, the controller 20 issues control signals to the fiber placement head 12 including, for example, the laser diode array 7, the drive roller assembly 12, the head drive assembly 22, and/or the compaction roller 5. Based on these control signals, the placement of the fiber tapes 2 is correspondingly automatically altered. For example, if the controller 20 detects a space between two fiber tapes 2 based on the digital images provided by the camera 9, the controller 20 issues control signals to the fiber placement head 12 so that the fiber placement head 12 automatically places the two fiber tapes 2 closer to one another. Similarly, if the controller 20 detects overlaps or twists in the fiber tapes 2, the controller 20 issues control signals to the fiber placement head 12 to automatically alter the placement of those fiber tapes 2 to correct the problem.

The inspection system 19 may comprise a number of additional or alternative elements. For example, in one embodiment, a pre-placement detector 21, such as a camera, monitors the fiber tapes 2 before they are placed onto the workpiece 4 and generates an output, such as a digital image, that is sent to the controller 20, which may issue control signals to the fiber placement head 12 and/or the operator to remedy the problems, preferably prior to creating a defect in the resulting part. The pre-placement detector 21 may include a camera for obtaining a digital image from which potential placement problems, such as gaps, overlaps, or twists, in or between the fiber tapes 2 may be detected. The pre-placement detector 21 may also detect material problems, such as variations in the size of the fiber tapes 2 or improper resin impregnation in the fiber tapes 2. The controller 20 uses the output from the pre-placement detector 21 to automatically alter system parameters such as the placement of the fiber tapes 2, the rate of placement of the tapes 2, and/or the amount of heating of the fiber tapes 2 by the laser diode array 7 in order to limit or prevent the production of a defective article.

In one embodiment of the present invention, the inspection system 19 includes a tack monitoring device 10 which can be seen in FIG. 4. There are various ways to detect the tack of the fiber tape 2, as known to those skilled in the art, but in this embodiment the tack monitoring device 10 measures the molecular mobility of the resin of the fiber tape 2 by measuring the nuclear magnetic resonance (NMR) T2 relaxation time. The NMR T2 relaxation time is determined by using a magnetic field to align the nuclear spins of the hydrogen nuclei present in the resin of the fiber tapes 2 and then measuring the rate of decay of the magnetization perpendicular to the applied magnetic field. By correlating the NMR T2 relaxation time with the degree of cure of the resin of the fiber tape 2 according to a predefined relationship, the NMR T2 relaxation time can be used as an indication of the tack of the resin of the fiber tapes 2 since the degree of cure of the resin provides a measure of indication of the tack of the resin. Thus, by measuring the molecular mobility of the resin, the tack monitoring device 10 can be used to measure the tack of the fiber tape 2. The use of NMR for measuring cure state is further discussed in "In-Process Monitoring of Pre-Staged Fiber Placement Tows Using Nuclear Magnetic Resonance (NMR)," by Roger W. Engelbart, et al., published in the proceeding of the 43$^{rd}$ International SAMPE Symposium, Anaheim, Calif., May 31–Jun. 4, 1998. It is understood that other methods exist and may be utilized for measuring the molecular mobility of the resin of the fiber tapes 2 and for correspondingly determining the tack of the resin of the fiber tape 2. The tack monitoring device 10 provides the measure of mobility to the controller 20 which, in turn, determines the tack of the resin. By comparing the measured tack to a predefined acceptable tack or range of tacks, the controller 20 can identify instances in which the tack is to be varied by being either insufficiently or excessively tacky. The controller 20 can then issue control signals altering the energy provided by the laser diode array 7, the rate of placement of the fiber tape 2, the compaction pressure, or some combination thereof.

Although a number of advantageous inspection systems have been described, the fiber placement machine 1 and associated method may include other types of inspection systems 19. For example, the fiber placement machine 1 includes detectors for monitoring the compaction pressure and/or the rate of fiber tape placement.

Also shown in FIG. 3 is a marking device 11 that is used to mark areas of the fiber tape 2 that correspond to areas where a defect is present. For example, if the controller 20 detects a gap between two fiber tapes 2 based upon the digital image captured by the camera 9, the controller 20 causes the marking device 11 to spray a marking agent such as ink, paint, or the like onto the surface of the workpiece 4 where the defect exists. The mark may be used subsequently for identification of the defect by manual or automated means. For example, the mark may alert a worker to the location of the defect, and the worker then evaluates and/or repairs the defect. Alternatively, the mark may be detected by a machine that automatically discards or repairs the affected region of the composite structure.

The controller 20 may use more than one threshold for identifying defects and initiating alterations in system parameters. For example, in the embodiment shown in FIG. 4, the controller is configured to cause the marking device 11 to mark a gap between fiber tapes 2 if the gap exceeds a defect threshold. However, if a gap is detected that is less than the defect threshold but greater than a correction threshold, the controller 20 will not cause the marking device 11 to mark the defect but will alter the head placement device 12 to decrease the space between the two fiber tapes 2. Thus, the fiber placement machine 1 takes corrective action to avoid a defect even before the defect becomes so severe as to require repair. Similarly, the controller 20 may detect an adhesion problem, for example by analyzing an output from the tack monitoring device 10 that indicates insufficient tack. Even if the adhesion problem is not so severe as to cause a defect, the controller 20 can automatically respond by altering a system parameter, for example by increasing the temperature of the fiber tape 2, increasing the compaction pressure, or decreasing the rate of placement of the fiber tapes 2.

The automatic, closed-loop controlled system and method of the present invention can therefore operate faster and with fewer interruptions than conventional fiber placement systems because human intervention is not required for inspection and repair. Thus, the fiber placement machine 1 of the present invention can operate closer to its maximum capacity than a traditional fiber placement machine. Also, by detecting defects quickly, the fiber placement machine 1 and method of the present invention enables defects to be rapidly corrected by automatically adjusting one or more system parameters that define an operational characteristic of the fiber placement machine 1. In addition, some potential defects may be detected prior to their occurrence, thereby permitting the operational characteristics of the fiber placement machine 1 to be adjusted to avoid the manufacture of a defective article. The result is a reduction in repair time of defective materials and an avoidance of defective materials that must be scrapped. Thus, the average cost per part is reduced due to the increase in operational efficiency of the machine and the reduction in repair time. Additionally, because defects can be detected more uniformly with the automated system and method than through traditional human inspection, the present invention enables an improvement in the overall quality of the parts produced.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a composite article from composite fiber tape, the method comprising:
    irradiating al least one fiber tape with a laser diode array;
    compacting the irradiated fiber tape against a workpiece such that the fiber tap conforms to the contour of the workpiece and is adhered thereto;
    inspecting the fiber tape and producing an output representative of at least one characteristic of the fiber tape; and
    automatically inspecting at least one system parameter defining an operational characteristic of the method based on the output,
    wherein inspecting the fiber tape comprises inspecting images of the fiber tape after the fiber tape has been compacted.

2. The method of forming a composite article of claim 1 wherein inspecting the fiber tape comprises detecting the tack of the resin of the fiber tape before compacting the fiber tape against the workpiece, and wherein automatically altering at least one system parameter comprises automatically altering the temperature of the fiber tape before compacting the fiber tape against the workpiece based on the tack of the resin of the fiber tape.

3. The method of forming a composite article of claim 1 wherein inspecting the fiber tape produces an output representative of at least one characteristic of the fiber tape, the characteristics selected from the group consisting of temperature of the fiber tape, temperature of the workpiece, rate of placement of the fiber tape, compaction pressure, tack of the fiber tape, and placement of the fiber tape relative to another fiber tape.

4. The method of forming a composite article of claim 1 wherein automatically altering at least one of the system parameters comprises automatically altering at least one system parameter selected from the group consisting of temperature of the fiber tape, temperature of the workpiece, rate of placement of the fiber tape, compaction pressure, tack of the fiber tape, and placement of the fiber tape relative to another fiber tape.

5. The method of forming a composite article of claim 1 further comprising:
    measuring the temperature in a plurality of sensing zones on al least one of the fiber tape and the workpiece; and
    automatically and independently irradiating a plurality of irradiation zones in accordance with the measured temperature.

6. The method of forming a composite article of claim 1 further comprising marking an area of the fiber tape to indicate a defect based on the inspection of the fiber tape.

7. A method of forming a composite article from composite fiber tape, the method comprising:
    irradiating al least one fiber tape with a laser diode array;
    compacting the irradiated fiber tape against a workpiece such that the fiber tap conforms to the contour of the workpiece and is adhered thereto;
    inspecting the fiber tape and producing an output representative of at least one characteristic of the fiber tape; and
    automatically inspecting at least one system parameter defining an operational characteristic of the method based on the output,
    wherein inspecting the fiber tape comprises measuring the molecular mobility of a resin of the fiber tape.

8. The method of forming a composite article of claim 7 wherein inspecting the fiber tape comprises inspecting images of the fiber tape after the fiber tape has been compacted.

9. The method of forming a composite article of claim 7 wherein inspecting the fiber tape comprises detecting the tack of the resin of the fiber tape before compacting the fiber tape against the workpiece, and wherein automatically altering at least one system parameter comprises automatically altering the temperature of the fiber tape before compacting the fiber tape against the workpiece based on the tack of the resin of the fiber tape.

10. The method of forming a composite article of claim 7 wherein inspecting the fiber tape produces an output representative of at least one characteristic of the fiber tape, the characteristics selected from the group consisting of temperature of the fiber tape, temperature of the workpiece, rate of placement of the fiber tape, compaction pressure, tack of the fiber tape, and placement of the fiber tape relative to another fiber tape.

11. The method of forming a composite article of claim 7 wherein automatically altering at least one of the system parameters comprises automatically altering at least one system parameter selected from the group consisting of temperature of the fiber tape, temperature of the workpiece, rate of placement of the fiber tape, compaction pressure, tack of the fiber tape, and placement of the fiber tape relative to another fiber tape.

12. The method of forming a composite article of claim 7 further comprising:
    measuring the temperature in a plurality of sensing zones on at least one of the fiber tape and the workpiece; and
    automatically and independently irradiating a plurality of irradiation zones in accordance with the measured temperature.

13. The method of forming a composite article of claim 7 further comprising marking an area of the fiber tape to indicate a defect based on the inspection of the fiber tape.

14. A method of forming a composite article from composite fiber tape, the method comprising:

irradiating al least one fiber tape with a laser diode array;

compacting the irradiated fiber tape against a workpiece such that the fiber tap conforms to the contour of the workpiece and is adhered thereto;

inspecting the fiber tape and producing an output representative of at least one characteristic of the fiber tape; and automatically inspecting at least one system parameter defining an operational characteristic of the method based on the output, wherein said irradiating step comprises independently irradiating a plurality of irradiation zones.

15. The method of forming a composite article of claim 14 wherein inspecting the fiber tape comprises inspecting images of the fiber tape after the fiber tape has been compacted.

16. The method of forming a composite article of claim 14 wherein inspecting the fiber tape comprises detecting the tack of the resin of the fiber tape before compacting the fiber tape against the workpiece, and wherein automatically altering at least one system parameter comprises automatically altering the temperature of the fiber tape before compacting the fiber tape against the workpiece based on the tack of the resin of the fiber tape.

17. The method of forming a composite article of claim 14 wherein inspecting the fiber tape produces an output representative of at least one characteristic of the fiber tape, the characteristics selected from the group consisting of temperature of the fiber tape, temperature of the workpiece, rate of placement of the fiber tape, compaction pressure, tack of the fiber tape, and placement of the fiber tape relative to another fiber tape.

18. The method of forming a composite article of claim 14 wherein automatically altering at least one of the system parameters comprises automatically altering at least one system parameter selected from the group consisting of temperature of the fiber tape, temperature of the workpiece, rate of placement of the fiber tape, compaction pressure, tack of the fiber tape, and placement of the fiber tape relative to another fiber tape.

19. The method of forming a composite article of claim 14 further comprising:

measuring the temperature in a plurality of sensing zones on at least one of the fiber tape and the workpiece; and automatically and independently irradiating a plurality of irradiation zones in accordance with the measured temperature.

20. The method of forming a composite article of claim 14 further comprising marking an area of the fiber tape to indicate a defect based on the inspection of the fiber tape.

* * * * *